(12) United States Patent
Staszewski et al.

(10) Patent No.: US 6,587,529 B1
(45) Date of Patent: Jul. 1, 2003

(54) PHASE DETECTOR ARCHITECTURE FOR PHASE ERROR ESTIMATING AND ZERO PHASE RESTARTING

(75) Inventors: Robert B. Staszewski, Garland, TX (US); Fulvio Spagna, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/258,827

(22) Filed: Feb. 25, 1999

(51) Int. Cl.[7] .................. H04L 25/00; H04L 25/40; H04L 7/00
(52) U.S. Cl. .................. 375/371; 360/51
(58) Field of Search ............... 375/371, 354, 375/355, 324, 325, 326, 327; 370/503; 360/51

(56) References Cited

U.S. PATENT DOCUMENTS 4,890,299 A * 12/1989 Dolivo et al.
5,552,942 A * 9/1996 Ziperovich et al. ........... 360/51
5,835,295 A * 11/1998 Behrens ....................... 360/51
6,005,507 A * 12/1999 Nakatsu et al. .............. 341/155

* cited by examiner

Primary Examiner—Jean Corrielus
(74) Attorney, Agent, or Firm—W. Daniel Swayze, Jr.; W. James Brady; Frederick J. Telecky, Jr.

(57) ABSTRACT

A system and method for enabling an efficient Zero Phase Restart (ZPR) of a device. The structure is based on deploying normalized timing gradient (NTG) blocks (501 and 502) in pairs, each circuit employing an orthogonal phase error transfer function characteristic (having one TG circuit sample orthogonally in relation to the other), for example, PR4 and EPR4 modes ideal sampling instances of a preamble. An NTG block (501 or 502) is selected based on having a native timing sampling instance with a phase error that is closest to zero. Since there is an equal chance that either of the circuits in a circuit pair will be selected, if the circuit implementing the current non-native architecture is selected, a separate signal is generated. This signal adds the equivalent of 180° to the error value that is provided to the timing recovery circuit. For example, by iterating the process after the special case of a zero phase restart (ZPR) operation, the native sampling instance is "forced" to be selected thereafter.

38 Claims, 5 Drawing Sheets

4 DETECTORS (2²)

PHASE DETECTOR ARCHITECTURE FOR PHASE ERROR ESTIMATING AND ZERO PHASE RESTARTING

FIELD OF THE INVENTION

The present invention relates to a method for estimating phase error, for example, of a timing recovery loop. More specifically, a preferred embodiment relates to efficiently selecting the starting phase for a timing recovery process in a sampled data detection system, such as a PRML or EPRML channel in a magnetic recording system.

BACKGROUND

Digital mass data storage devices such as a disk drive record digital sequences onto media and retrieve them from an analog signal, unfortunately corrupted by noise from various sources. It is desired to achieve the highest recording density per unit area while attaining an acceptable probability of error between the signal recorded and that retrieved. To achieve this goal, a disk drive's read channel uses equalization and coding prior to processing in a digital signal processor. One solution is to use run-length limited (RLL) codes with a RLL encoder and decoder.

Digital mass data storage devices use RLL codes, when applied to data only, to improve signal-to-noise ratio (SNR) or to implement frequent updates to the timing recovery and automatic gain control loops, or both. The RLL codes use two parameters, d and k, controlling the minimum and maximum number of symbol intervals between transitions in the input signal, respectively. For a given d, the RLL code dictates at least "d+1", and at most "k+1", symbol intervals between transitions. Conventionally used codes are those with (d, k) constraints of (1, 7) and (2,7), generally used with peak detection methods.

These asynchronous methods detect single pulses. The "k" constraint insures that a non-zero channel output is produced with some minimum frequency to maintain robust operation of timing recovery and AGC loops. The "d" constraint insures acceptable SNR with peak detection.

Conventional methods for estimating the initial phase error for ZPR have been applied to determine "zero-crossings" of analog, i.e., continuous, time signals. Of course, this is inappropriate for handling discrete, or digital, pulses.

Some conventional disk drives, for example, use continuous time peak detection designs to recover digital data written as a series of magnetic transitions on a recording surface of a rotating magnetic disk. A voltage controlled oscillator (VCO) uses an "Enable" command for controlled starting and stopping of the oscillator. When the "Enable" command is asserted, the VCO begins oscillating in a known state. The rising edges of the clock's transition occur at a fixed delay interval after "Enable" is asserted.

In turn, "zero phase restart" (ZPR), also sometimes referred to as zero phase start, senses a logic transition of a read gate control signal ("Rd Gate") from inactive to active, and disables the VCO. Upon arrival of a subsequent "transition edge" at the ZPR logic, "Enable" is reasserted and the timing control circuit VCO is restarted. A timing delay block compensates for the delays associated with detection and restart, which results in the next transition edge and the first clock output coinciding at the input to the phase-frequency detector. Starting phase error, $\theta$ is brought near zero while PLL acquisition time is reduced.

One effect that limits the recording density in mass data storage systems is intersymbol interference (ISI). ISI is endemic to the band-limited nature of the head/media combination and results in overlapping responses. That is, at a given time, the output signal contains the response due to the input signal and the responses from some previously recorded symbols. This overlap increases as recording density or disk rotation speed is increased, yielding overlap patterns that are generally very difficult to decode.

To reduce the complexity required to decode, the readback signal in the read channel is first equalized to a prescribed partial response (PR) signal. PR signals permit a controlled overlap of responses in the output signal. A priori knowledge of the "controlled overlap" significantly reduces the complexity of the required detector, compared to that required for an unequalized signal.

One commonly-used PR target signal in digital magnetic recording systems is characterized by the transfer function $P(D)=1-D^2$, where D is the transform of the unit symbol delay operation. This PR signal is commonly referred to as a "Class IV PR" or "PR4." The noise-free output response at a suitably prescribed sampling instant for PR4 is given by $$Y(nT)=a(nT)-a[(n-2)T] \quad (1)$$

where:

$$n = 2, 3, \ldots$$

$a(nT)$ = the input symbol at time instant $nT$, normally picked from a binary alphabet, $\{0, 1\}$ or $\{1, -1\}$.

That is, the output sample at time instant, nT, involves the overlap of two input symbols, a(nT) and a[(n−2)T].

The equalized signal is then detected using a sequence detector such as a Viterbi Detector (based on the Viterbi Algorithm). This combination of PR4 and Viterbi detection is commonly referred to as "PRML" for "partial response maximum-likelihood."

To increase storage density and throughput rate, sampling techniques, such as the above Partial Response (PR) signaling and Maximum Likelihood (ML) sequence detection are used.

The choice of the PR target signal is dictated by the linear density of the recording (as well as additional functions that may be required of the system). A single system may require two different PR target signals, e.g., PR4 and EPR4. Many PR targets exist for magnetic recording and are now commonly referred to as the "Extended Class IV" family of PR signals. The Extended Class IV family of PR signals is defined by the polynomials $P(D))=(1-D)(1+D)^n$, where n is a positive integer. Note that n=1 yields the standard PR4 signal; while n=2 yields EPR4; and n=3 yields $E^2$ PR4, etc.

Correct operation of any PRML system depends on sampling the readback signal synchronously. Even small time shifts from the correct sampling instant act to distort the sample values. To maintain proper timing of the read data, a timing recovery circuit, often a PLL, is used to adjust the phase of a VCO based on the phase error, $\theta$ determined by a digital phase error detector receiving input from an analog-to-digital converter (ADC).

During acquisition, the phase error, $\theta$ is defined as being zero when the rising edge of the clock signal is aligned with the ideal sampling instances of the input signal. A non-zero phase error, $\theta$ causes the error detector to send a signal to a loop filter that outputs a signal proportional to the phase error. This signal shifts the instantaneous frequency of the VCO in order to subsequently match the phase of the input signal.

A PRML read channel uses ML detectors to "read" data based on sampled sequences of an analog waveform read from a disk, rather than by analyzing a single peak as in conventional peak detection. These samples are obtained by using an ADC that samples and quantizes the read waveform at predetermined sampling intervals. The intervals are controlled by a clock synchronizing the ADC and the incoming signal. The clock also must be phase aligned to the incoming signal.

To achieve proper timing and phase synchronization, a conventional PRML read channel uses a timing control circuit to acquire and lock frequency and phase synchronization. The timing control circuit uses a PLL circuit to generate a phase-coherent clock so that data samples may be taken at predetermined locations along the input signal. It is necessary to first lock the PLL circuit to a reference so that the required sampling frequency can be acquired and tracked.

A phase detector processes the signal samples to calculate a phase error, $\hat{g}$ between the actual and desired signals. A compensation to this phase error is used to adjust the sampling frequency that is typically the output of a VCO, with the compensation for the phase error value as the control input. The output of the VCO controls the sampling period of an ADC. Conventionally, long acquisition times are addressed by applying a relatively large initial correction to the VCO, thus enabling a quick phase match. Subsequent phase locking can then proceed more rapidly, while avoiding the reverse-slope null.

The amount of correction is determined by sampling phase difference at start of fast acquisition. The instantaneous phase and frequency of the signal are determined by digital processing as opposed to comparing signal transition edges using peak detection. A timing recovery circuit processes the samples to estimate phase, $\hat{g}$ and frequency, $\hat{f}$, errors. In one application, using part digital and part analog processing, these estimates are forwarded to a timing control DAC (not shown) and converted into analog error estimates for timing recovery circuit processing.

The time it takes a timing recovery circuit to recover a synchronous data clock signal impacts both the speed of acquisition and the amount of required disk space. In conventional disk drives, when the "READ" mode is entered, the PLL acquires the initial data clock frequency, f, and phase, $\phi$, from a known preamble waveform, most often a sinusoid, that precedes the input signal.

By minimizing PLL acquisition time, performance and capacity are improved. Early conventional PLLs had long acquisition times, and failed to lock within a desired maximum time. This problem is identified in a paper by Floyd M. Gardner entitled "Hangup in Phase-Lock Loops", EEE Transactions on Communications, Vol. COM-25, No. 10, October 1977. Gardner observes that acquisition may start around a "reverse-slope null", i.e., a metastable point where the initial phase difference is halfway between two stable phase-locked operating points. In this instance, acquisition may take additional cycles. Further, the presence of non-negligible noise can exacerbate this.

There are other methods for acquiring and tracking a sampling frequency. Timing recovery methods for synchronous data receivers have been investigated by K. H. Mueller and M. Müller, "Timing recovery in digital synchronous data receivers," EEEE Trans. Commun., Vol. COM-24, pp. 516–530, May 1976, incorporated herein by reference.

Specifically, for PRML it has been proposed by F. Dolivo, W. Schott, and G. Ungerboeck, "Fast timing recovery for partial response signaling systems," Int. Conf. Commun. '89, ICC'89, Boston, Mass., June 1989 (incorporated herein by reference) to update the timing phase at time instant nT using the timing gradient defined as:

$$\hat{g}(\text{error}) = -y_n \times x_{n-1} + y_{n-1} \times x_n \tag{2}$$

where:

$y_n$ = the sampled value at $n$ $x_n$ = the ideal sample value that is closest to $y_n$.

In a PRML channel, $x_n$ is restricted to the values +1, 0, or −1. Once $\hat{g}$ is obtained, a PLL circuit is used to recover the sampling clock. The PLL operation is divided into two stages, acquisition and tracking.

Conventionally, a sinusoid is written onto the disk, usually at the start of each track. It is known as the preamble. Following the preamble on the disk is the user data that is sampled in tracking mode. The preamble is read during the acquisition mode and data are read during the tracking mode. Since the sampling clock should be at the ideal sampling frequency and phase after acquisition, the PLL's bandwidth is lowered in the tracking mode to reduce timing jitter.

These designs use a timing gradient (TG) calculated using actual signal samples and estimated signal samples obtained from symbol-by-symbol decisions. See "Timing Recovery in Digital Synchronous Receivers" by K. H. Mueller and M. Müller, supra.

One inherent drawback of these designs is that during acquisition the sampling point may occur at the point halfway between the desired sampling times. Consequently, the method for correcting the phase may reverse its direction of adjustment several times in the vicinity of this metastable equilibrium point for an extended period of time. Although this "hang-up" effect does not frequently occur, the length of the acquisition preamble must be sufficiently long so that the system may still synchronize given this situation. A long preamble, however, reduces the total amount of storage space available for user data.

A further concern is the non-linear characteristic of the timing gradient circuit when tracking random user data. Because the method for calculating the timing gradient is based on approximating the slope of the pulses, the gain of the timing gradient circuit varies when tracking random user data due to inconsistent pulse slopes. This variation in gain results in less than optimum timing recovery.

Another approach uses a single "TG circuit" to gather a rough estimate of the ideal sampling instances. This yields ZPR samples that may be metastable. Further, if these samples are averaged to reduce noise contributions, and, if "hangup" is to be avoided, a hysteresis effect must be introduced in order to reduce the probability of reversals in the once chosen direction of timing and phase adjustment. Having this additional function, i.e., the introduction of hysteresis, to address further complicates the solution and also reduces performance by increasing latency.

A method for avoiding the "hang-up" effect in order to reduce the preamble length has been perfected. With this method, a sliding threshold, based on past estimated values around X(n), introduces a hysteresis effect that makes reversals in timing phase adjustments very unlikely. However, the estimated sample values around X(n) are reconstructed from the signal sample values, Y(n), and are therefore subject to error. Errors in the estimated sample values further increase the necessary length of the acquisition preamble. In order to minimize the initial phase error between the sampling clock and the preamble, ZPR has been used with conventional timing control circuits.

Upon obtaining an initial input-signal-to-clock phase difference, the VCO is stopped in order to adjust for any phase difference. The ZPR method applies a controlled phase delay within the timing control circuit, permitting a "restart" of the read channel in phase alignment with the incoming signal. A ZPR circuit for timing acquisition in a PRML recording channel is described in Dolivo et al., "Fast Timing Recovery for Partial-Response Signaling Systems", Proc. of ICC '89 (IEEE), Jun. 11–14, 1989.

In conventional designs, a PLL circuit controls the timing recovery in PRML recordings. A phase detector processes the signal samples to generate a phase error, $\theta$, between the actual and desired frequency. Compensation for this phase error is used to adjust the sampling frequency, e.g., the output of a VCO, the phase error compensation being the input. The output of the VCO controls the sampling instances of an ADC. It is necessary to first lock the PLL to a reference frequency so that the required sampling frequency can be acquired. Phase lock occurs when a preamble appears under the readback head of the disk drive. A longer acquisition time requires a longer preamble, thus, reducing space available for user data. One technique for locking the PLL to a reference frequency injects into the ADC a sinusoid of one fourth the nominal sampling frequency.

The PLL must be switched synchronously between the clock signal and the input signal so that additional phase corrections are not needed. Also, the PLL must not be referenced to the clock after the VCO is re-started. Should this occur, disruptive phase corrections from the clock interfere with phase locking.

Conventional ZPR designs are susceptible to noise on both the clocking and the input signal. Noise on the input signal contributes to inaccurate phase measurement, leading to inaccurate phase correction that may increase actual acquisition time. One type of noise is termed "pulse pairing" noise. Pulse pairing causes adjacent pulses to have alternating, i.e., early and late, phase errors. Conventional ZPR designs do not detect pulse pairing since they rely on a single initial measurement.

Other designs include a pulse position detector to detect the phase difference between data pulses and clock pulses, and an averaging circuit to determine the average amount of phase difference over several pulses. This average value is then used to stop the VCO to correct for this average phase error. Preferably, averaging takes place over an even number of pulses, thereby diminishing the effect of pulse pairing noise.

Implementations of EPRML channels have been documented by R. Wood, "Turbo-PRML: A Compromise EPRML Detector," IEEE Trans. on Magnetics, vol. 29, no. 6, pp. 4018–4020, November 1993, herein incorporated by reference, and E. Eleftheriou and W. Hirt, "Improving Performance of PRML/EPRML through Noise Prediction," INTERMAG 96, Seattle, Wash., April 1996, also herein incorporated by reference. These implementations universally require a signal processing block after the conventional PR4 Viterbi detector in order to optimize EPRML performance without modifying the timing recovery circuit.

Correct gain control is important because decisions about data, samples and timing all assume that system amplification is correct. For example, for PR4, the +1 and −1 levels and for EPR4, the +2, +1, −1 and −2 levels, should be known a priori. Therefore, conventional mass data storage devices use a variable gain amplifier (VGA) to maintain a constant sampled signal amplitude. Controlling a VGA to maintain a constant amplitude is also known as automatic gain control (AGC). Implementing AGC during analog acquisition, the VGA sends the amplified sine wave to an equalizer, e.g., a digital FIR filter, to output an equalized signal. A feedback loop controls VGA operation during analog acquisition. Implementing AGC during digital tracking, the equalized signal is digitized in an ADC and forwarded to a detector where it is fed back to the VGA to adjust gain.

AGC functions for PRML read channels have been proposed that update the VGA gain by using the gradient derived from the following relationships:

$$e_n = y_n - x_n \tag{4}$$

$$\text{gain}(e_n) = e_n \times x_n \tag{5}$$

where:

$y_n$ = the sampled value at $n$, $x_n$ = the ideal sample value that is closest to $y_n$ $e_n$ = the decision error.

Note that $x_n$ is either +1, −1 or 0, for PR4.

Once the gain error is obtained, the AGC loop adjusts the gain of the VGA. The operation of the AGC is divided into two stages, acquisition and tracking.

During acquisition, a sinusoid with a period equal to 4T is used to provide the signal amplitude reference. Either continuous-time or discrete-time methods can be used to implement the acquisition mode. See R. Cideciyan, F. Dolivo, R. Hermann, W. Hirt and W. Schott, "A PRML System for Digital Magnetic Recording," IEEE Journal on Selected Areas in Communications, Vol. 10, No.1, pp. 38–56, January 1992 and R. Yamasaki, T-W. Pan, M. Palmer and D. Browning, "A 72 Mb/s PRML Disk-Drive Channel Chip with an Analog Sampled-Data Signal Processor," Proc. of IEEE ISSCC, San Francisco, 1994, pp. 278–279 incorporated herein by reference.

In the continuous-time implementation, a peak detector is used to derive the amplitude error. After acquisition, assuming that the gain of the VGA is appropriate, the bandwidth of the AGC is reduced for the tracking mode, thus reducing noise sensitivity.

EPR4 relaxes the need for equalization as compared with PR4 (for higher channel densities). Having a lower high frequency SNR than PR4enables EPR4 operation at higher linear densities. However, this comes at a price of added complexity, in turn, leading to longer processing times and lower throughput rates.

A further consideration is the non-linear characteristic of the timing gradient circuit when tracking random user data. Because the method for calculating the timing gradient is based on approximating the slope of the pulses, the gain of the timing gradient circuit varies when tracking random user data because of changing pulse slopes. This variation in gain induces sub-optimum timing recovery.

Therefore, what is needed is to provide a method and system for optimizing the restart associated with a timing recovery process. Further, the system should be capable of optimizing the starting phase for timing acquisition in multiple operating modes and should be transparent to a user.

SUMMARY

A preferred embodiment of the present invention uses an architecture having one or more pairs of timing gradient (TG) circuits with center of zero-crossing operating points of each circuit of a pair located at opposing sampling instances, i.e., orthogonal to each other. For example, the center timing instances for a Partial Response Class 4 (PR4) detector are at $$\frac{\pi}{4}, \frac{3\pi}{4}, \frac{5\pi}{4}, \frac{7\pi}{4}$$

along the ideal sinusoidal waveform provided as a preamble, while the timing instances for EPR4 are at $$0, \frac{\pi}{2}, \pi, \frac{3\pi}{2}, \text{ and } 2\pi.$$

Further, neither circuit of the pair is required to exhibit a hysteresis property, thus reducing latency and processing complexity.

Before the initiation of a ZPR operation, each circuit of the installed pair(s) of timing gradient (TG) circuits is normalized if the two TG slopes of each pair are not the same and to allow for use of the power of two modulo arithmetics. This insures the same values for transfer characteristics. The circuits are then activated to calculate phase errors within each of their respective timing sampling instances. At the moment of ZPR activation, the one circuit of each pair of circuits that is closest to zero (i.e., gives the better quality of the phase error estimate) phase error is selected via a comparator circuit. (If more than one pair of TG circuits is used, then that circuit of all of the included circuits with the lowest error value is selected.). Since the initial phase error distribution is uniform, either of the pair (or any of the circuits of multiple pairs) has an equal chance of being chosen. In the case where a non-native TG is closer to the desired timing sampling instances, a separate signal is generated indicating that a phase shift (e.g., the equivalent of 180° for one pair of TG circuits) should be added to the resultant phase error values. This equivalent of 180° addition could be cyclically added either in the phase detector (internally) or in the timing circuit (externally). After initial ZPR operation, the resultant phase error should approach zero, thus "forcing" selection of the native TG thereafter. Note that FIG. 8a provides angular measurements of a sinusoid (preamble) and FIGS. 8b and 8c provide angular measurements of a bit.

An additional benefit of using at least one pair of TG circuits is that the resulting phase error transfer curve now has at least two extremely accurate operational points that are also signal amplitude independent. This results in any maximum incurred error being at least half what it would have been using only a single TG circuit.

Some of the salient advantages of the present invention are that it:

imposes no requirement for memory (e.g., a register) at each stage.
reduces latency.
reduces net overhead.
is ideally suited to use in those systems calling for dual operating schemes employing two different decoding architectures
performs calculations in acquisition stage when there is more time available and then flips the result to the tracking stage.
does not require hysteresis effects be introduced.
accurately estimates total phase shift while incurring a minimum hardware burden.
reduces error propagation.
uses less complicated computational architecture.
includes at least two accurate points for operation on the error transfer curve.
can be made extremely accurate by simply adding circuits to operate, as needed, in pairs.

Thus, it is a general advantage of the present invention to improve the timing recovery method in synchronous partial response magnetic recording systems.

Further, an advantage of the present invention is to provide a ZPR optimization system that determines an optimal starting phase for a timing control circuit oscillator, thereby minimizing clock recovery time.

A more specific advantage of the present invention is to provide a ZPR that uses a minimum amount of hardware and subsequent silicon area on a chip.

A further advantage of the present invention is that it provides a ZPR optimization system and control algorithm that determines the optimal restart phase for an oscillator clocking signal provided to an ADC for sampling an incoming analog signal.

A further advantage of phase optimization is minimization of the frequency transient, since frequency may be derived by integration of the phase error, $\hat{\theta}$. Accordingly, smaller phase errors, $\hat{\theta}$, result in lower frequency errors and shortened acquisition of the preamble.

In sum, the invention can achieve better noise performance by finding an average phase difference rather than an instantaneous one.

A preferred method used for the starting phase selection in a timing recovery process involves receiving a "known" (to an accurate degree) frequency sampled signal at two similar TG circuits. The received sampled signal is sent in parallel to each TG circuit and a comparator, e.g., minimum of absolute value, compares the error values produced from each TG circuit. An adjusted starting phase is selected, based on a signal representing the lesser absolute value of the two error values. The timing recovery circuit is coasting during this period until the user wants to use it. The timing gradient closest to zero is then either latched or averaged over a few cycles until ZPR is initiated.

DETAIL DESCRIPTION OF THE PREFERRED EMBODIMENTS

Figure 1:
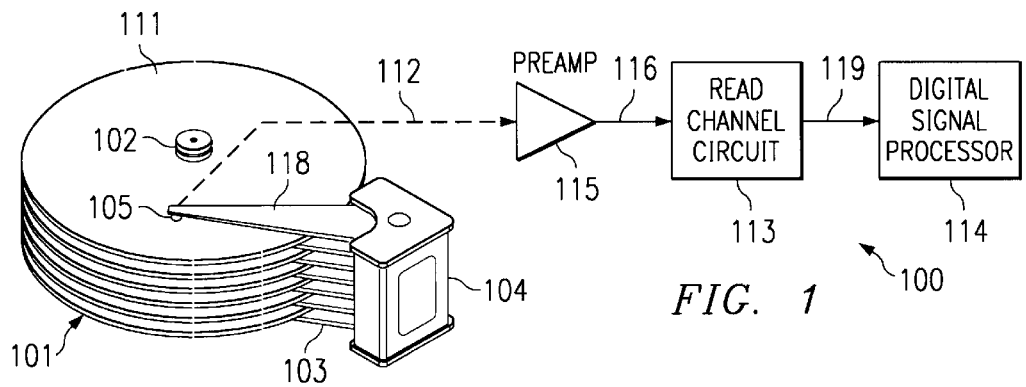
FIG. 1 is a diagram of a mass data storage device and part of its read circuitry.

FIG. 1 is a diagram of parts of a mass data storage device 100, including part of its read circuitry 113. The hard disk drive 101 contains several magnetic disks 111, each containing data on its magnetic surface 117 and each associated with an arm 103 controlled by a voice coil motor 104, the arms being connected to spindle 102 that is rotated by a spindle motor (not shown). At the outer end of each arm 103 is a read/write head 105 for reading from and writing to the disks 111. A magnetic disk output signal 112 from read/write head 105 is input to a preamp 115 that, in turn outputs amplified signal 116 to read channel circuit 113. The output signal is transmitted on path 119 from the read channel circuit 113 to a controller or digital signal processor 114.

Figure 2:
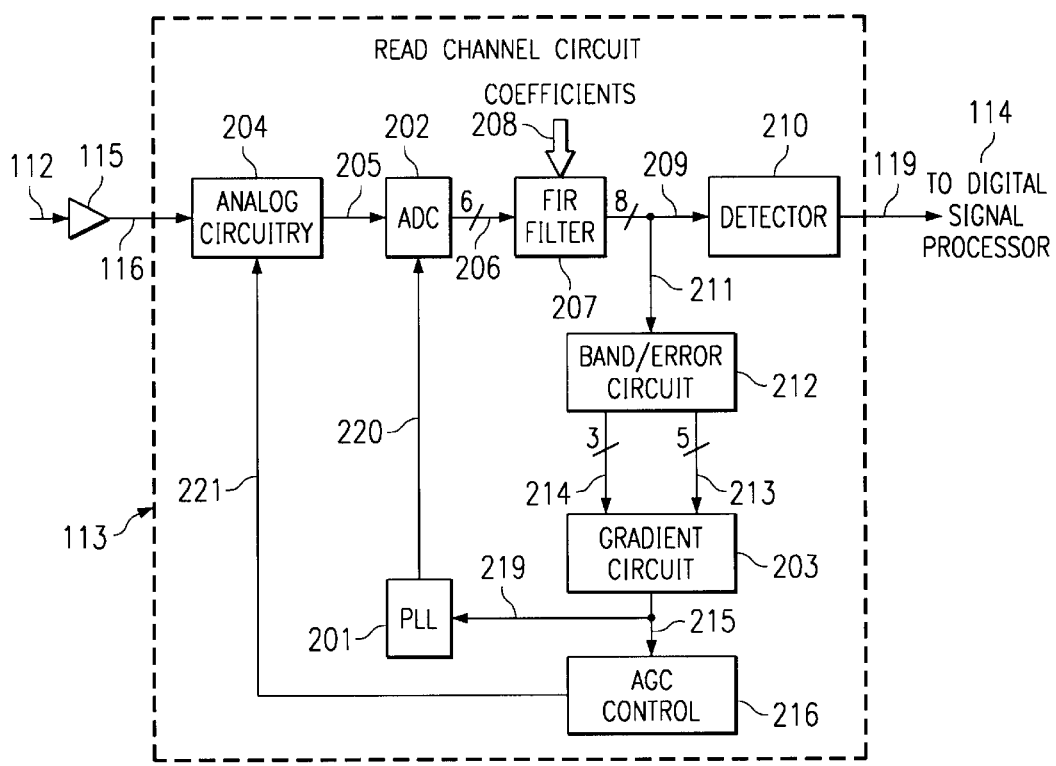
FIG. 2 is a block diagram of a read channel circuit according to the prior.

FIG. 2 shows a conventional read channel circuit 113 of FIG. 1 in more detail and conventional circuitry for applying time and gain control. Shown, as input is the output signal 116 of preamp 115 of FIG. 1 that conditioned the read signal 112 from the disk 111 of FIG. 1. Analog circuitry 204 of FIG. 2 is available for gain amplification and signal conditioning during signal processing within read channel circuitry 113. A conditioned analog signal is provided on path 205 FIG. 2 from analog circuitry 204 FIG. 2 to an analog-to-digital converter (ADC) 202 FIG. 2. One embodiment includes a 6-bit digital signal output from ADC 202 FIG. 2 on path 206 FIG. 2 to a FIR filter 207 FIG. 2 having taps (not shown) each associated with a coefficient 208 FIG. 2 provided by source (not shown) external to the read channel circuitry 113 FIG. 1. An 8-bit filtered digital output signal is provided on path 209 FIG. 2 to a detector 210 FIG. 2 for output on path 119 of FIG. 1 to the digital signal processor 114 of FIG. 1. In one embodiment, a second path 211 FIG. 2 is provided for feedback purposes, first to a band/error detection circuit 212 FIG. 2, the output of which is provided as a 5-bit higher order signal on path 213 FIG. 2 and a lower order 3-bit signal on path 214 FIG. 2 to a gradient block 203 FIG. 2 containing timing and gain gradient circuits (not separately shown in FIG. 2). An output signal is provided from the gradient block 203 FIG. 2 on path 215 FIG. 2 to automatic gain control (AGC) circuitry 216 FIG. 2 from the gain gradient circuit (not shown) of block 203 FIG. 2. From the AGC 216 FIG. 2 an adjustment, or feedback, signal is provided over path 221 FIG. 2 to analog circuitry 204 FIG. 2. Another output signal from the timing gradient circuit (not shown) in block 203 FIG. 2 is sent over path 219 FIG. 2 to phase locked loop (PLL) 201 FIG. 2. From PLL 201, a feedback of phase adjustment signal is sent over path 220 FIG. 2 to ADC 202 FIG. 2. FIG. 2 is provided as an example of the conventional method of providing timing and gain control, permitting an understanding of the concepts leading to a preferred embodiment of the present invention.

Figure 3:
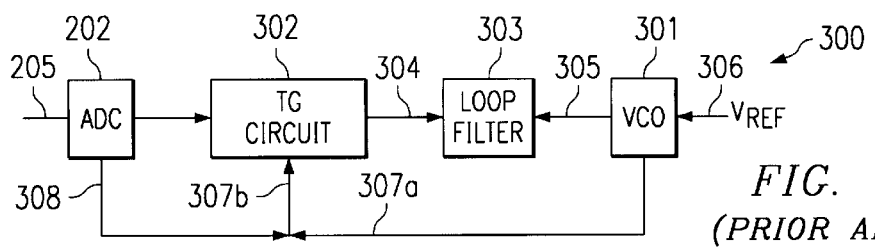
FIG. 3 is a block diagram of a conventional timing recovery circuit connected to a timing gradient generator via a loop filter.

FIG. 3 depicts a block diagram of a conventional timing recovery loop 300. The digital PLL 201 in FIG. 2, employing a VCO (not shown in FIG. 2, 301 in FIG. 3), generates the sampling clock of ADC 202 shown receiving input from analog circuitry 204 FIG. 2 along path 205. In order to lock the PLL 201 FIG. 2 to a required sampling frequency, a sinusoid (not shown) at one-fourth the sampling frequency (4T, where T is the bit period) By is injected into the ADC 202 FIGS. 1 and 2. An error is computed using the results from one circuit of a pair (or one circuit from multiple pairs if more than one pair is used) of timing gradient (TG) circuits (not shown, but included in block 203 of FIG. 2). The timing gradient calculators of timing gradient circuit 302 of FIG. 3 provide input over path 304 to a proportional-and-integral loop filter 303 that is connected via path 305 to VCO 301. In turn, VCO 301 receives a reference signal from an external source (not shown) over path 306. VCO 301 provides adjustment or feedback signals over paths 307a and 307b to timing gradient calculators 302 as well as to ADC 202 over paths 307 and 308. Note that what is conventionally termed a phase detector is the final stages of ADC 202 and the timing gradient calculators of the timing gradient circuit 302 in FIG. 3. FIG. 3 is provided as an example of the conventional method of providing timing and phase control, permitting an understanding of the concepts leading to a preferred embodiment of the present invention.

Figure 4:
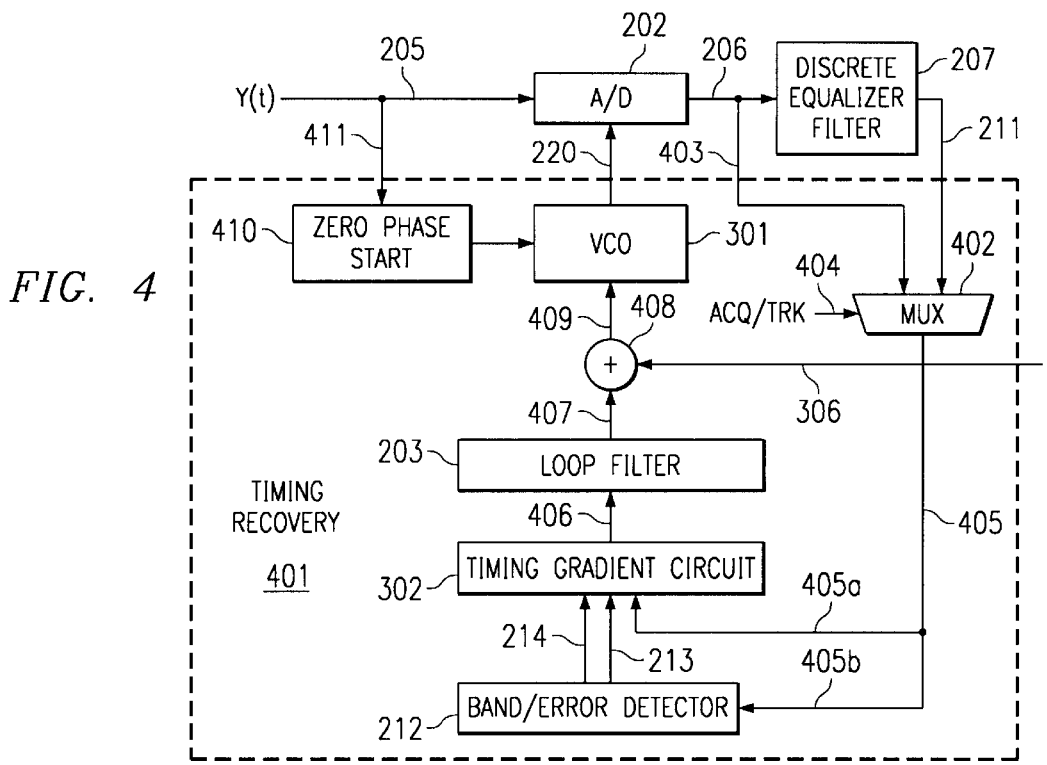
FIG. 4 is a block diagram of a conventional timing recovery circuit.

FIG. 4 shows the position of the pieces of conventional timing recovery loop 300 of FIG. 3 in relation to conventional timing recovery circuitry 401. FIG. 4 shows input from analog circuitry 204 of FIG. 2 along path 205 FIG. 4 to ADC 202 FIG. 4 and along path 206 to the FIR filter 207 FIG. 4. Additional detail is provided about multiplexer 402 that selects output signals from ADC 202 FIG. 4 along path 403 FIG. 4 or output from FIR filter 207 FIG. 4 along path 211 FIG. 4. Also indicated as input to the multiplexer 402 FIG. 4 is an input, ACQ/TRK 404 FIG. 4, from an external source (not shown) providing status on the mode, ACQ being acquisition of the preamble sinusoid (not shown), and TRK indicating tracking of the digital signal output along path 209 FIG. 2 from FIR filter 207 FIG. 2. The output of the multiplexer 402 FIG. 4 is provided along paths 405 FIG. 4 and 405a FIG. 4 to timing gradient circuit 302 FIG. 4 and along paths 405 FIG. 4 and 405b FIG. 4 to band/error detection circuit 212 FIG. 4. The band/error detector circuit 212 FIG. 4 outputs the higher order 5-bit signal along path 213 FIG. 4 and the lower order 3-bit signal along path 214 FIG. 4 to the timing gradient circuit 302, FIG. 4. The timing gradient circuit 302 FIG. 4 provides output along path 406 FIG. 4 to the loop filter 203 FIG. 4. The output of the loop filter 203 FIG. 4 is provided to a summer 408 FIG. 4 along path 407 FIG. 4 together with a frequency reference signal along path 306 FIG. 4 from an external source (not shown). The output of the summer 408 FIG. 4 is transmitted along path 409 FIG. 4 to VCO 301 FIG. 4. VCO 301 FIG. 4 also receives input from a zero phase re-start circuit 410 FIG. 4. The output of the VCO serves to adjust timing of the ADC along path 220. The zero phase restart circuit 410 FIG. 4 receives a continuous time ADC input waveform along path 411 FIG. 4. FIG. 4 is provided as an example of the conventional method of providing timing, phase, and gain control, permitting an understanding of the concepts leading to a preferred embodiment of the present invention.

Figure 5:
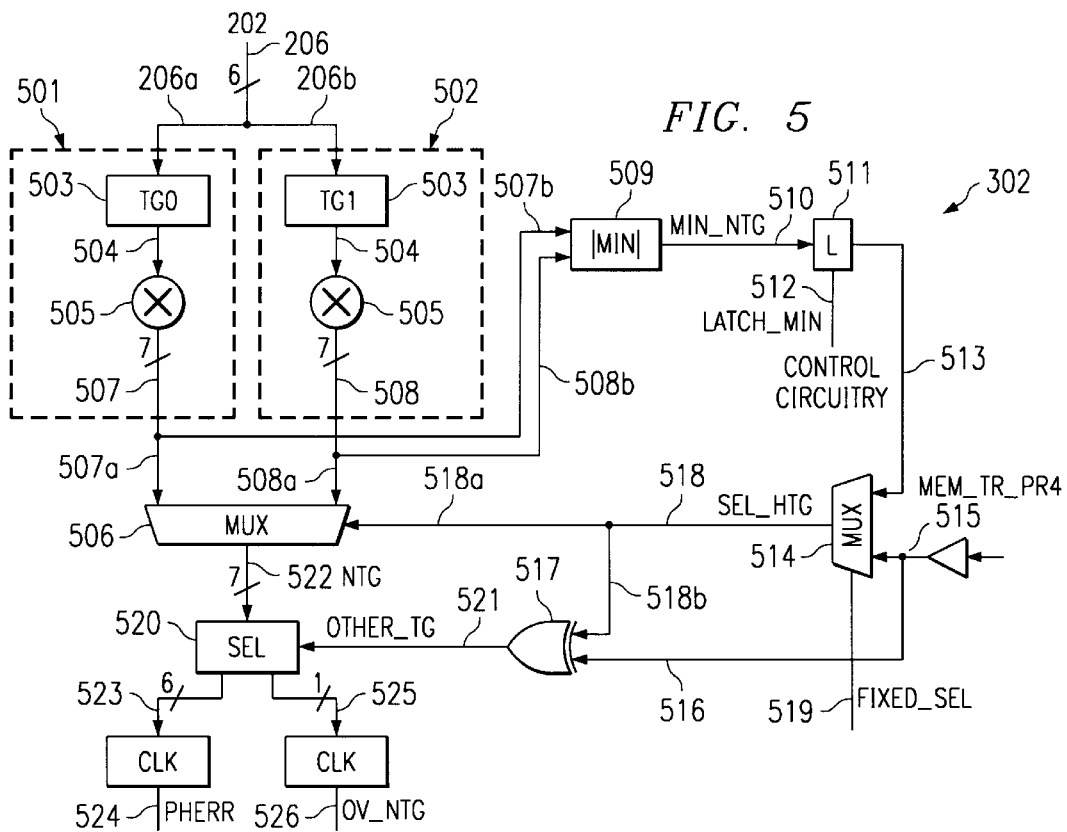
FIG. 5 is a block diagram of timing gradient generator operation for a preferred embodiment of the present invention.

FIG. 5 provides a block diagram of a preferred embodiment of the timing gradient circuit 302 FIG. 3 of the timing recovery circuitry 401 FIG. 4. The input is shown as a 6-bit signal from ADC 202 FIG. 2 along path 206 FIG. 5 then splitting along paths 206a and 206b FIG. 5 to a pair of normalized timing gradient (NTG) blocks, the one in the dotted box 501 FIG. 5 leading from path 206a designated as TG₀ 503 FIG. 5, and the other in the dotted box 502 FIG. 5 leading from path 206b designated TG, 503 FIG. 5. Each of the NTG blocks 501 and 502 are similar, thus, a description of NTG block 501 suffices for TG path 502.

NTG₀ block 501 FIG. 5 consists of a timing gradient circuit 503 FIG. 5 having as input the output signal provided from ADC 202 FIG. 2 along paths 206 and 206a FIG. 5, whose output is clocked on path 504 FIG. 5 by a clock (not shown) and optionally normalized by a multiplicative factor established in an external source (not shown) as shown by the multiplier at 505 FIG. 5. The normalization is optional depending on the system architect's requirements, e.g., if the slopes of the timing gradients TG₀ and TG₁ are equal, normalization might not be needed. Another benefit of normalization would be to bring the arithmetics down to modulo 2, should that be desirable.

In a preferred embodiment, outputs from TG₀ and TG₁ are provided as 7-bit signals to a multiplexer 506 FIG. 5 along paths 507 and 507a FIG. 5 for TG₀ and along paths 508 and 508a FIG. 5 for TG₁. The output from TG₀ is also fed along paths 507 and 507b FIG. 5 to an absolute value comparator |min| 509 FIG. 5. Similarly the output from TG₁ is sent along paths 508 and 508b FIG. 5 to absolute value comparator |min| 509 FIG. 5. The values of the output signals from NTG₀ and NTG₁ are compared in absolute value comparator |min| 509 FIG. 5 and indicates which of the two are closer to zero, outputted as signal MIN_NTG along path 510 FIG. 5 to latch 511 FIG. 5. Latch 511 FIG. 5 receives signal LATCH_MIN along path 512 FIG. 5 from external control circuitry (not shown). When the signal LATCH_MIN, provided along path 512 FIG. 5 to latch 511 FIG. 5, is at logic LOW, the latch 511 FIG. 5 is transparent. Once ZPR is initiated; then the signal to latch 511 FIG. 5 is latched.

In a preferred embodiment, from latch 511 FIG. 5 the output signal is fed along path 513 FIG. 5 to multiplexer 514 FIG. 5 where either signal MEM_TR_PR4 provided from an external source (not shown in FIG. 5) along path 515 FIG. 5 to multiplexer. 514 or signal FIXED_SEL FIG. 5 from a timing recovery loop (not shown in FIG. 5) along path 519 FIG. 5 is selected. Signal MEM_TR_PR4 is also provided along path 516 FIG. 5 as an input to XOR gate 517 FIG. 5.

The output from multiplexer 514 FIG. 5 is provided as signal SEL_NTG along paths 518 and 518b FIG. 5 to XOR gate 517 FIG. 5 and along path 518 and 518a to multiplexer 506 FIG. 5. The output from the XOR gate 517 FIG. 5 is provided as signal OTHER_TG to selection circuit SEL 520 FIG. 5 along path 521 FIG. 5. Signal OTHER_TG provides the equivalent of 180° addition as necessary to adjust to a native timing gradient. The output from multiplexer 506 FIG. 5 is also sent as signal NTG (normalized TG), a 7-bit signal to adjustment circuit SEL 520 FIG. 5 along path 522 FIG. 5. From SEL 520 FIG. 5, two output signals are provided. Along path 523 FIG. 5, a 6-bit output signal is clocked by register along path 524 FIG. 5 and provided as the phase error signal PHERR output to the timing recovery control circuit (not shown). The optional signal indicating overflow, OV_NTG, is provided as a 1-bit signal along path 525 FIG. 5 where it is clocked at path 526 FIG. 5 and output to an external receiver (not shown in FIG. 5). The contributions of the aforementioned signals will be elaborated on below.

LATCH_MIN, provided on path 512 FIG. 5 to latch 511 FIG. 5, is the control signal from the timing recovery circuit (not shown in FIG. 5). Its transition to HIGH latches the current state of the comparator 509 FIG. 5 that determines which of the two (or more) NTG blocks 501 and 502 FIG. 5 has the output with the smaller magnitude.

FIXED_SEL, input on path 519 FIG. 5 to multiplexer 514 FIG. 5, provides the control signal from the timing recovery circuit (not shown in FIG. 5). A logic HIGH value fixes selection of the appropriate NTG block 501 or 502 FIG. 5 based on the MEM_TR_PR4 setting provided on path 515 FIG. 5 to multiplexer 514 FIG. 5.

MEM_TR PR4, sent along path 515 FIG. 5 to multiplexer 514 FIG. 5, provides a register memory bit from an external source (not shown in FIG. 5). In a preferred embodiment, a logic HIGH value indicates the PR4 operational mode of the timing recovery circuit (not shown in FIG. 5).

Zero Phase Restart (ZPR) operation. Before the ZPR operation begins, LATCH_MIN, provided on path 512 FIG. 5 to latch 511 FIG. 5, is at a default logic LOW state in preparation for selecting and outputting phase 4 error, $\theta$ from the NTG block of the pair 501 FIG. 5 and 502 FIG. 5 that is closer to the ideal sampling instance of the appropriate timing recovery mode (in a preferred embodiment, either PR4 or EPR4). Multiplexer 514 FIG. 5 provides a zero output.

At the actual instance of ZPR calculation, the bit-by-bit selection of the closer NTG block 501 FIG. 5 or 502 FIG. 5 is fixed by transitioning the LATCH_MIN signal provided along path 512 FIG. 5 to latch 511 FIG. 5 to logic HIGH. This ensures that during subsequent phase error accumulation and averaging, that same NTG block 501 FIG. 5 or 502 FIG. 5 will be used. Once ZPR is performed, FIXED_SEL, provided along path 519 FIG. S to multiplexer 514 FIG. 5, transitions to logic HIGH, and the NTG block 501 FIG. 5 or 502 FIG. 5 is selected for the duration of the preamble acquisition mode. This assumes that, after ZPR, residual phase error, $\theta$ is quite small and within the linear range of the NTG block 501 FIG. 5 or 502 FIG. 5.

For the "ZPR-disabled" mode. If the ZPR operation is not performed, the initial phase position may be in a metastable region of the NTG block 501 FIG. 5 or 502 FIG. 5, potentially causing a "hang-up." Therefore, as in the "ZPR-enabled" mode, the NTG block 501 FIG. 5 or 502 FIG. 5 that exhibits an error closer to zero has to be initially selected by keeping LATCH_MIN, provided along path 512 FIG. 5 to latch 511 FIG. 5, at logic LOW. After a few clock cycles, it must be ensured that the NTG block 501 FIG. 5 or 502 FIG. 5 is selected by transitioning FIXED_SEL, provided along path 519 FIG. 5 to multiplexer 514 FIG. 5, to logic HIGH. Note that, assuming a uniform distribution of initial phase error, the chance of the initial phase being in the metastable region is quite small. However, should this occur, the resulting phase error, $\theta$ i.e., the error value produced by the opposite (non-native) NTG block 501 FIG. 5 or 502 FIG. 5, would be very stable and near its maximum value, ensuring a quick adjustment away from it.

Figure 6:
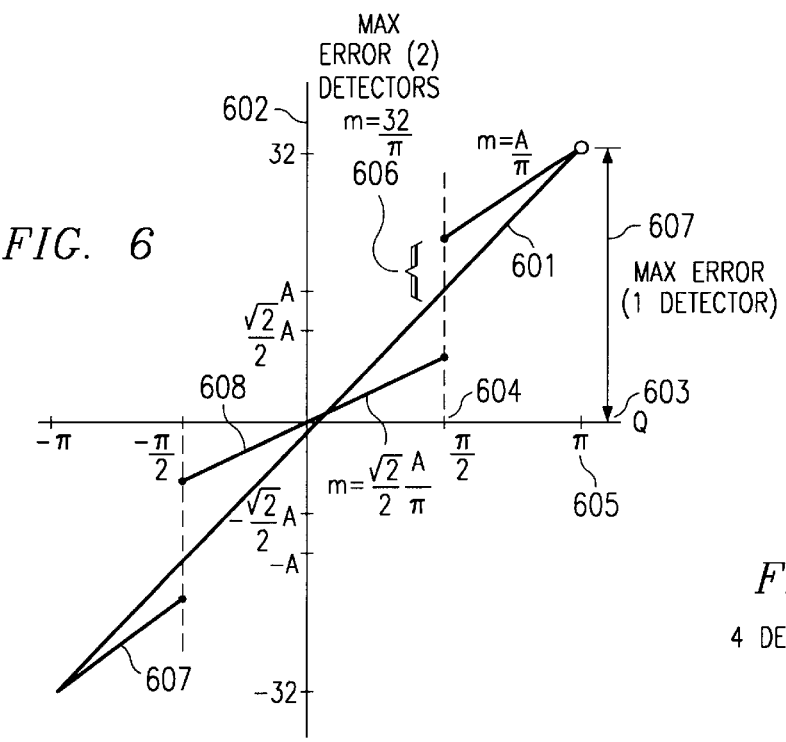
FIG. 6 is a graph showing maximum phase estimation error using two timing gradient circuits as compared to a single timing gradient circuit.
Figure 7:
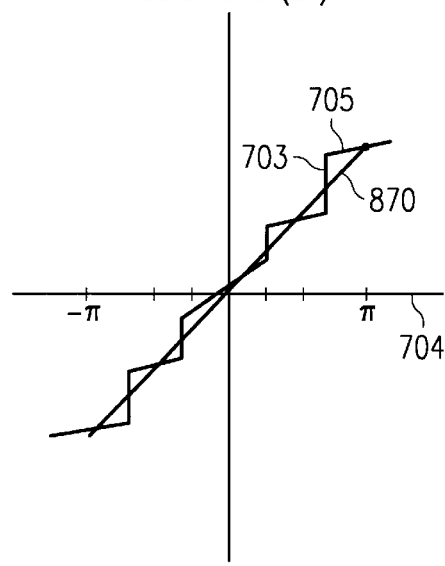
FIG. 7 delineates transfer functions for 4 detectors.

A preferred embodiment will enable a more precise determination of phase error, $\theta$ in both amplitude and direction, by employing NTG blocks 501 FIG. 5 and 502 FIG. 5 that implement phase error transfer characteristics that are orthogonal to each other. For each additional pair of circuits employed, accuracy is doubled. For example, using PR4 mode for one NTG block FIG. 5 and EPR4 mode for the other 502 FIG. 5 of a pair, enables a 50% reduction of phase error. This is readily seen in FIG. 6. in which phase error, $\theta$ 602 FIG. 6, is plotted against phase, $\phi$ 603 FIG. 6. By applying the Pythagorean Theorem, and observing that the error now is at worst case at $\pi/2$ 604 FIG. 6, the introduction of an additional TG circuit indicated by 607 FIG. 6 to the single TG circuit indicated by 608 FIG. 6, operating in a native mode orthogonal to that of the first TG circuit, has moved the worst case error from the position of π 605 FIG. 6 to π/2 FIG. 6, thus halving the error as seen at 606 FIG. 6, with respect to ideal decision line 601 FIG. 6, compared to a single TG circuit as seen at 607 FIG. 6. Further, by employing additional pairs of orthogonal TG circuits, additional accuracy can be attained. See FIG. 7, depicting worst case phase error occurring in graph 703 FIG. 7 for the case represented by 705 FIG. 7 in which two pairs of TG circuits (thus 2×2=4 detectors) are used, at π/4 704 FIG. 7.

Because the timing gradient circuits are deployed in pairs does not mean that an even number of circuits (with respective decoding architectures) need be used in a preferred embodiment of the present invention. It can be seen that by switching the native timing instance for any given two (a pair) f the three, six different combinations are now available to the system architect, either programmable by the user or available to a vendor for different applications.

Note that it may be advantageous to add the necessary equivalent of 180° to the selected non-native TG value externally to the phase detector circuitry 501 or 502 FIG. 5. For example, if this value is computed in the timing recovery circuit PLL 201 in FIG. 2, the averaging would be done first before the divide-and-add function for adjusting from the non-native TG circuit.

The slope at the ideal sampling points of a PRML mode can be obtained by one of two methods, the derivative method or the maximum range slope method. The derivative method is derived as follows for the PR4 mode and the EPR4 mode:

$$\underline{PR4}\text{ Mode} \quad \Delta_0 = \frac{d}{d\theta} A \sin\left(\frac{\pi}{4}\right) = A \cos\frac{\pi}{4} = \frac{\sqrt{2}}{2} A \quad (6a)$$

$$\Phi_0 = 2 \times \frac{\sqrt{2}}{2} A = \sqrt{2} A \quad (6b)$$

$$\underline{EPR4}\text{ Mode} \quad \Delta_1 = \frac{d}{d\theta} A \sin(0) = A \cos 0 = A \quad (6c)$$

$$\Phi_1 = A \quad (6d)$$

$$\text{Ratio} \quad \frac{\Phi_0}{\Phi_1} = \frac{\sqrt{2} A}{A} = \sqrt{2} \quad (6e)$$

where:

$\Delta_0$ = slope for *PR4* native timing mode $\Delta_1$ = slope for *EPR4* native timing mode $\Phi_0$ = phase error for *PR4* native timing mode The maximum range slope method is derived as follows for the PR4 mode and the EPR4 mode:

$$\underline{PR4}\text{ Mode} \quad \Phi_0 = \frac{A}{\frac{\pi}{2}} \quad (7a)$$

$$\underline{EPR4}\text{ Mode} \quad \Phi_1 = \frac{\frac{\sqrt{2}}{2} A}{\frac{\pi}{2}} \quad (7b)$$

$$\text{Ratio} \quad \frac{\Phi_0}{\Phi_1} = \frac{\frac{A}{\frac{\pi}{2}}}{\frac{\frac{\sqrt{2}}{2} A}{\frac{\pi}{2}}} = \sqrt{2} \quad (7c)$$

A key point in determining phase error, $\hat{\theta}$ that any estimate is a function of amplitude of the signal, A 802 in FIG. 8. Thus, if the estimate of the signal amplitude, Â, is not accurate, the initiation of ZPR will not be accurate.

Figure 8A:
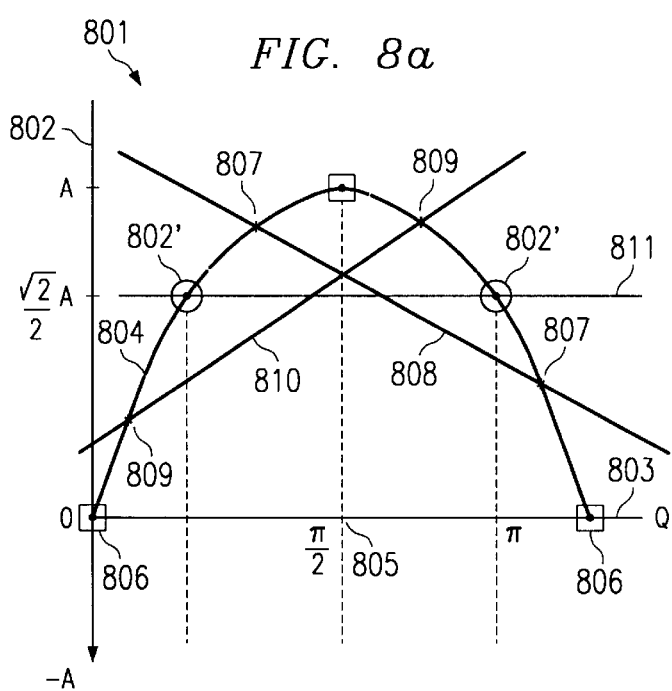
FIG. 8a is a depiction of sampling points for a preferred embodiment that shows PR4, EPR4, and "worst case" sampling points associated with both positive and negative timing gradient slopes.
Figure 8B:
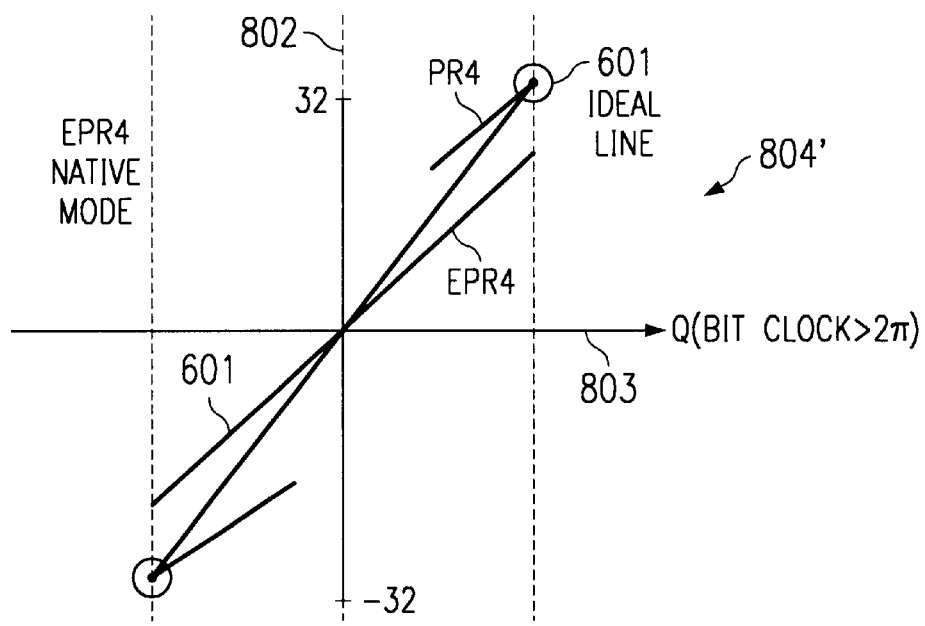
FIG. 8b depicts the TG circuit transfer function for EPR4 native mode with PR4 mode superimposed with an appropriate offset equivalent to 180°.
Figure 8C:
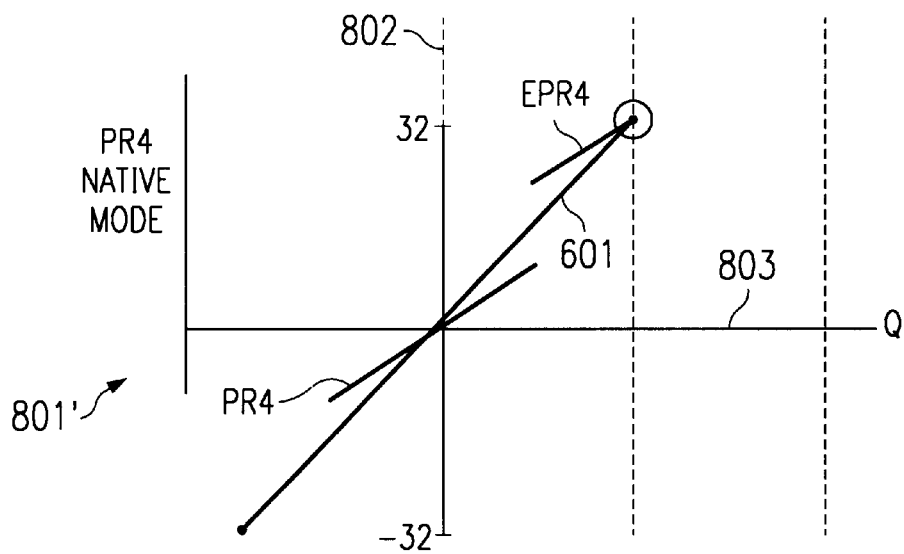
FIG. 8c depicts the TG circuit transfer function for PR4 native mode with EPR4 mode superimposed with an appropriate offset equivalent to 180°.

FIG. 8a depicts the positive portion of a sinusoidal preamble 804 provided for acquisition on path 205 FIG. 2 to ADC 202 FIG. 2. The sampling instances for PR4 mode are shown at 802' of FIG. 8a, while those for EPR4 mode are shown at 806 of FIG. 8a. Should the sampling points erroneously fall at points 807 FIG. 8a, then a positive PR4 timing gradient (negative slope) would be evident as line 808 FIG. 8 shows. Conversely, if the sampling points erroneously fall at points 809 FIG. 8a then a negative PR4 timing gradient (positive slope) would be evident as line 810 FIG. 8 shows. A zero timing gradient is given as line 811 FIG. 8 between points 802 FIG. 8 using PR4 sampling mode as an example. Note that, for FIG. 8a, the preamble period is shown along the x-axis 803 FIG. 8 with a period equal to 2π. Contrast this with FIGS. 8b and 8c that show the bits sampled along the x-axis 803 FIG. 8 with a bit clock period of 2π.

FIGS. 8b and 8c depict detector output, A 802, versus phase error, $\hat{\theta}$ 803, for EPR4 native timing instance mode 804° FIG. 8 and PR4 native timing instance mode 801' FIG. 8, respectively. Observe the relative position of FIGS. 8a, 8b, and 8c, and note that the EPR4 and PR4 timing instances are orthogonal to one another and that the worst case of their respective deviations from the desired decision line (the 45° line through the origin) 601 FIG. 6 occurs at π/2 805 FIG. 8, and odd multiples thereof. Also note that the two modes for each pair must be normalized, if their slopes differ, in order to be able to correctly select the amplitude, A 802 FIG. 8, of the NTG block 501 FIG. 5 or 502 FIG. 5 that is closest to zero phase error. The normalization is shown in FIG. 9 where it can be seen that normalized 901 FIG. 9 is at the same slope as normalized NTG$_0$ 903 FIG. 9 as compared to un-normalized TG$_1$ 902 FIG. 9 and TG$_0$ 904 FIG. 9.

Figure 9:
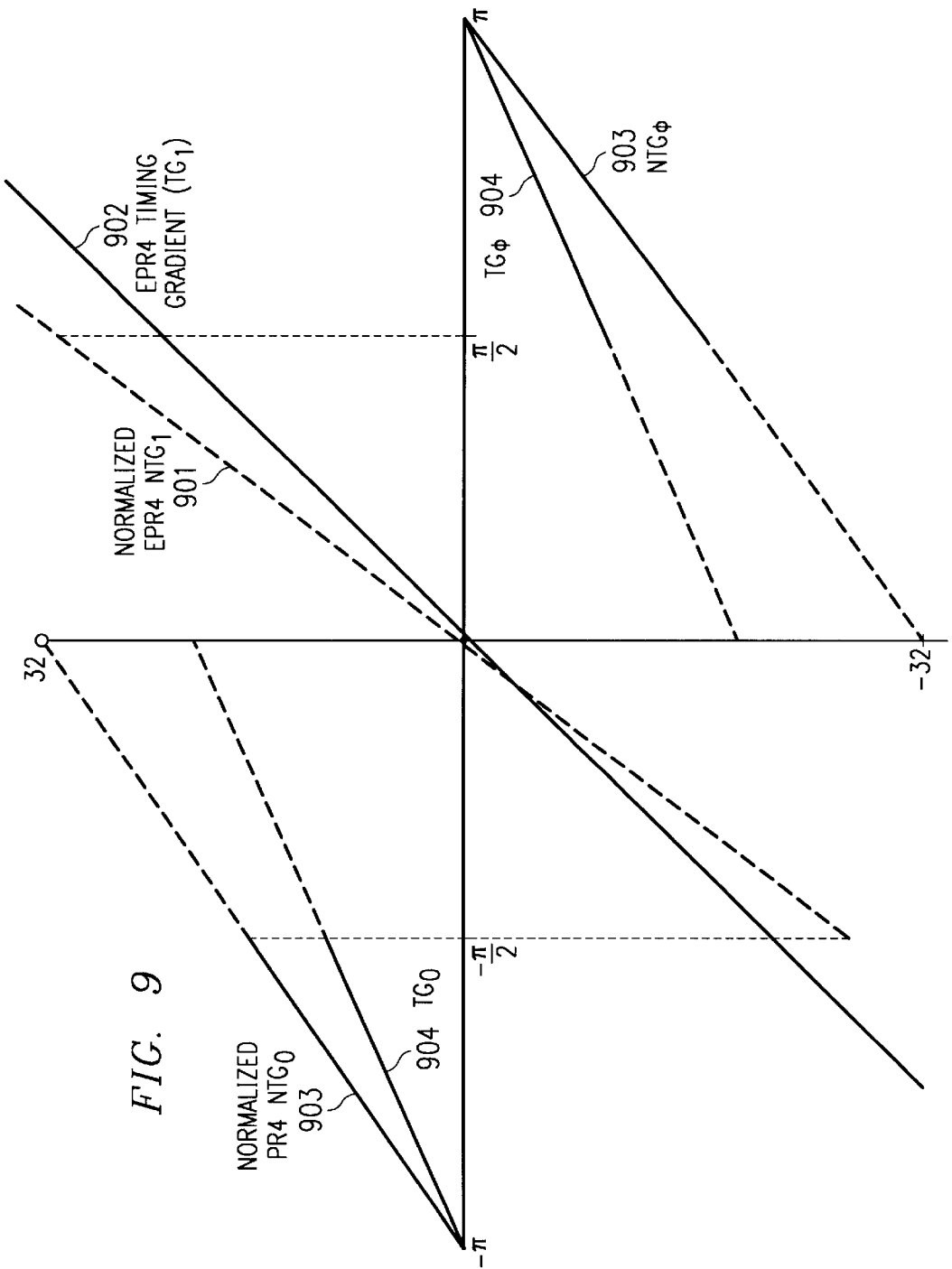
FIG. 9 depicts the phase estimation error when EPR4 is the native mode, including worst case at π/2 and multiples thereof, for a TG circuit employing normalized EPR4 used in combination with a TG circuit employing normalized PR4 mode.

Native TG slopes are defined as follows:

$$\underline{PR4}\text{ 904 in Fig. 9} \quad m = \frac{A}{\pi} \quad (8a)$$

$$\underline{EPR4}\text{ 902 in Fig. 9} \quad m = \frac{\sqrt{2}}{2} \frac{A}{\pi} \quad (8b)$$

and the normalized idealized slopes will be:
normalized 901 in FIG. 9

$$m = \frac{32}{\pi} \quad (8c)$$

where:
m=the slope, and
A=32 when phase selection is done with a 6-bit number (0→63), and 32 occurs at π/2, assuming a 4T sinusoid preamble.

FIG. 6 depicts the normalized phase detector output, 602, vs. phase, 603, for the above case, where:

$$\Delta_0 = \frac{A}{32},$$

slope for PR4 native timing mode (9a)

$$\Delta_1 = \frac{\frac{\sqrt{2}}{2}A}{32} = \frac{A}{45.255},$$

slope for EPR4 native timing mode (9b)

The foregoing describes the salient features of the present invention's use of pairs of timing gradient circuits having sampling instances orthogonal to one another, and should not be interpreted as limiting the application of, method of operation, or uses for the present invention to that specified in the foregoing.

While the invention has been shown with specific equations and methods of implementation, and further described with regard to specific filter types, it will be understood by those skilled in the art that various other changes in the selection of equations and use with different combinations in implementation, or other details, may be changed without departing from the spirit and scope of the invention.

We claim:

1. A method for estimating phase error when processing a digitized signal in a timing recovery circuit operable in a system associated with a memory and also incorporating a phase detector having an input and an output, comprising:

a) employing timing gradient circuits, one of said timing gradient circuits being a native gradient circuit and another of said timing gradient circuits being a non-native gradient circuit, each of said timing gradient circuits implementing a different phase error transfer characteristic;

b) normalizing, if necessary, each of said timing gradient circuits; and c) estimating a phase adjustment operation;

wherein, if said native timing gradient circuit has a timing instance closer to zero phase error than said non-native timing gradient circuit, then an adjustment value, x, a number associated with said native timing gradient circuit, is inputted to the timing recovery circuit, and wherein, if said non-native timing gradient circuit has a timing instance closer to zero phase error than said native timing gradient circuit, then an equivalent of 180° is added to said value x.

2. The method of claim 1 further comprising iterating said steps b) and c) until fixing said value, x, wherein said value x is derived from a device outputting a number.

3. The method of claim 1 wherein said equivalent of 180° is input as a state to the memory prior to being processed in an internal calculation.

4. The method of claim 1 wherein said equivalent of 180° is input as a separate signal to the timing recovery circuit.

5. The method of claim 1 further comprising minimizing the phase error wherein adjustment of the phase is initiated.

6. The method of claim 5 further comprising iterating steps a through c for purposes of initiating a zero phase restart (ZPR).

7. The method of claim 5 further comprising providing said equivalent of 180° as a separate signal to the timing recovery circuit for use in initiating a zero phase restart.

8. The method of claim 5 further comprising providing said equivalent of 180° as a state to the memory prior to being processed in an internal calculation prior to use in a zero phase restart.

9. The method of claim 2 wherein said device calculates a minimum of the absolute value |min| of said adjustment value x, wherein |min| is fixed as an adjustment value.

10. The method of claim 2 wherein said device calculates $x^2$, the square of said adjustment value x, wherein $x^2$ is fixed as an adjustment value.

11. The method of claim 1 wherein said timing gradient circuits comprise a pair of timing gradient circuits, being mathematically described as maximally separated from each other, such that each of said timing gradient circuit has sampling instances orthogonal to sampling instances of other said timing gradient circuits.

12. The method of claim 11 wherein said orthogonality is obtained by the use of PRML encoding methods PR4 and EPR4, wherein either method is selected as the native timing gradient.

13. The method of claim 1 further enabling modulo/circular arithmetics if the phase detector output corresponds to an equivalent of 180°, wherein adding the equivalent of 180° involves inverting the MSB bit of the phase detector output.

14. A system incorporating a phase detector having an input and an output, a timing recovery circuit, and in association with a memory, comprising:

a native timing gradient circuit and a non-native timing gradient circuit, for generating first and second outputs $TG_0$ and $TG_1$, respectively; and a comparator for receiving said $TG_0$ and $TG_1$ and comparing values thereof, wherein, if said native timing gradient circuit has a timing instance closer to zero phase error than said non-native timing gradient circuit, then an adjustment value, x, a number associated with said native timing gradient circuit, is inputted to the timing recovery circuit, and wherein, if said non-native timing gradient circuit has a timing instance closer to zero phase error than said native timing gradient circuit, then an equivalent of 180° is added to said adjustment value x.

15. The system of claim 14 wherein said equivalent of 180° is input as a state to the memory for further processing prior to input to the timing recovery circuit.

16. The system of claim 14 wherein said equivalent of 180° is input as a separate signal to the timing recovery circuit for further processing.

17. The system of claim 14 wherein said timing gradient circuits are provided as a pair, each circuit of said pair employing a native sampling instance orthogonal to the native sampling instance of the other of said timing gradient circuits.

18. The system of claim 14 wherein said equivalent of 180° is input as a state to the memory for further processing prior to input to the timing recovery circuit for use in initiating a zero phase restart.

19. The system of claim 14 wherein said equivalent of 180° is input as a separate signal to the timing recovery circuit for further processing prior to use in initiating a zero phase restart.

20. The system of claim 14 further enabling modulo/circular arithmetics, if the phase detector output corresponds to an equivalent of 180°, wherein adding the equivalent of 180° involves inverting the MSB bit of said phase detector output.

21. The system of claim 14 wherein said timing recovery circuit implements a phase-locked loop (PLL).

22. A phase detector, having an input and an output, and an association with a memory and a timing recovery circuit, comprising:

a native timing gradient circuit and a non-native timing gradient circuit, for generating first and second outputs $TG_0$ and $TG_1$, respectively; and a comparator for receiving said $TG_0$ and $TG_1$ and comparing values thereof, wherein, if said native timing gradient circuit has a timing instance closer to zero phase error than said non-native timing gradient circuits, then an adjustment value, x, a number associated with said native timing gradient circuit, is inputted to the timing recovery circuit, and wherein, if said non-native timing gradient circuit has a timing instance closer to zero phase error than said native timing gradient circuit, then an equivalent of 180° is added to said adjustment value x.

23. The phase detector of claim 22 wherein said equivalent of 180° is input as a state to the memory for further processing prior to input to the timing recovery circuit.

24. The phase detector of claim 22 wherein said equivalent of 180° is input as a separate signal to the timing recovery circuit for further processing.

25. The phase detector of claim 22 wherein said timing gradient circuits are provided as a pair, each circuit of said pair employing a native sampling instance orthogonal to the native sampling instance of the other of said timing gradient circuits.

26. The phase detector of claim 22 wherein said equivalent of 180° is input as a state to the memory for further processing prior to input to the timing recovery circuit for use in initiating a zero phase restart.

27. The phase detector of claim 22 wherein said equivalent of 180° is input as a separate signal to the timing recovery circuit for further processing prior to use in initiating a zero phase restart.

28. The phase detector of claim 22 further enabling modulo/circular arithmetics if the phase detector output corresponds to an equivalent of 180°, wherein adding the equivalent of 180° involves inverting the MSB bit of said phase detector output.

29. The phase detector of claim 22 wherein the timing recovery circuit implements a phase-locked loop (PLL).

30. A mass data storage system incorporating a phase detector having an input and an output, and an association with a memory and a timing recovery circuit, comprising:

a native timing gradient circuit and a non-native timing gradient circuit, for generating first and second outputs $TG_0$ and $TG_1$, respectively; and a comparator for receiving said $TG_0$ and $TG_1$ and comparing values thereof, wherein, if said native timing gradient circuit has a timing instance closer to zero phase error than said non-native timing gradient circuits, then an adjustment value, x, a number associated with said native timing gradient circuit, is inputted to the timing recovery circuit, and wherein, if said non-native timing gradient circuit has a timing instance closer to zero phase error than said native timing gradient circuit, then an equivalent of 180° is added to said adjustment value x.

31. The mass data storage system of claim 30 wherein said equivalent of 180° is input as a state to the memory for further processing prior to input to the timing recovery circuit.

32. The mass data storage system of claim 30 wherein said equivalent of 180° is input as a separate signal to the timing recovery circuit for further processing.

33. The mass data storage system of claim 30 wherein said timing gradient circuits are provided as a pair, each circuit of said pair employing a native sampling instance orthogonal to the native sampling instance of the other of said timing gradient circuits.

34. The mass data storage system of claim 30 wherein said equivalent of 180° is input as a state to the memory for further processing prior to input to the timing recovery circuit for use in initiating a zero phase restart.

35. The mass data storage system of claim 30 wherein said equivalent of 180° is input as a separate signal to the timing recovery circuit for further processing prior to use in initiating a zero phase restart.

36. The mass data storage system of claim 30 further enabling modulo/circular arithmetics if the phase detector output corresponds to an equivalent of 180°, wherein adding the equivalent of 180° involves inverting the MSB bit of said phase detector output.

37. The mass data storage system of claim 30 wherein the timing recovery circuit implements a phase-locked loop (PLL).

38. The mass data storage system of claim 30 wherein the mass storage system comprises a disk drive.

* * * * *